United States Patent
Newton (10) Patent No.: US 9,494,327 B2
(45) Date of Patent: Nov. 15, 2016

(54) UV LAMP SERVICE LIFE INDICATOR DEVICE AND METHOD OF USING THE SAME

(71) Applicant: Trane International Inc., Piscataway, NJ (US)

(72) Inventor: Brian John Newton, West Salem, WI (US)

(73) Assignee: TRANE INTERNATIONAL INC., Piscataway, NJ (US)

(*) Notice: Subject to any disclaimer, the term of this patent is extended or adjusted under 35 U.S.C. 154(b) by 232 days.

(21) Appl. No.: 14/297,926

(22) Filed: Jun. 6, 2014

(65) Prior Publication Data

US 2014/0359991 A1 Dec. 11, 2014

Related U.S. Application Data (60) Provisional application No. 61/831,902, filed on Jun. 6, 2013.

(51) Int. Cl.
| | |
|---|---|
| F24F 3/16 | (2006.01) |
| B01D 53/00 | (2006.01) |
| B01D 46/00 | (2006.01) |
| F24F 11/00 | (2006.01) |

(52) U.S. Cl.
CPC .............. *F24F 3/16* (2013.01); *B01D 53/007* (2013.01); *B01D 2259/804* (2013.01); *F24F 2003/1667* (2013.01); *F24F 2011/0091* (2013.01); *Y10T 29/4973* (2015.01)

(58) Field of Classification Search
CPC B01D 46/0086; B01D 53/00; B01D 53/007; B01D 2259/804; F24F 3/16; F24F 11/00; F24F 2011/0091; G01N 21/77; G01C 1/02; G01C 1/04; G01C 1/10; G01T 1/02; G01T 1/04; G01T 1/10

USPC ............ 116/200, 202, 206; 250/372, 458.1, 250/459.1; 313/9

See application file for complete search history.

(56) References Cited

U.S. PATENT DOCUMENTS

| | | | |
|---|---|---|---|
| 4,392,102 A | 7/1983 | Sugalski et al. | |
| 4,991,074 A * | 2/1991 | Kobayashi | H01J 61/35 116/216 |
| 5,218,834 A | 6/1993 | Major et al. | |
| 6,040,777 A | 3/2000 | Ammann et al. | |
| 6,077,522 A * | 6/2000 | Scher | A01N 25/04 424/405 |
| 6,787,108 B2 * | 9/2004 | Ribi | G01N 31/229 116/206 |
| 6,979,361 B2 | 12/2005 | Mihayiov et al. | |
| 7,185,601 B2 * | 3/2007 | Carpenter | G01N 21/293 116/206 |
| 7,486,025 B2 * | 2/2009 | Beland | H01J 5/16 313/493 |

(Continued)

FOREIGN PATENT DOCUMENTS

| | | | | |
|---|---|---|---|---|
| DE | 102008021585 | * | 11/2009 | H01J 61/35 |
| JP | 55014679 A | * | 2/1980 | H01J 61/72 |

(Continued)

*Primary Examiner* — R. A. Smith
(74) *Attorney, Agent, or Firm* — Hamre, Schumann, Mueller & Larson, P.C.

(57) ABSTRACT

A UV lamp service life indicator device includes an indicator member including a material that degrades at a rate sufficient to track a useful life of a UV lamp, where the indicator member indicates whether the UV lamp has come to an end of its service life. The indictor device can also include a reference component that indicates whether the UV lamp has come to an end of its service life.

16 Claims, 7 Drawing Sheets

(56) References Cited

U.S. PATENT DOCUMENTS

| | | | |
|---|---|---|---|
| 7,632,459 B2 | 12/2009 | Lentz et al. | |
| 7,682,830 B2 * | 3/2010 | Prusik | G01N 31/229 116/216 |
| 8,278,631 B2 * | 10/2012 | Patel | G01J 1/50 250/474.1 |
| 8,859,995 B2 * | 10/2014 | Liu | A62B 9/006 250/458.1 |
| 2003/0101872 A1 | 6/2003 | Peel et al. | |
| 2004/0224417 A1 * | 11/2004 | Wang | G01N 27/06 436/39 |
| 2005/0118054 A1 | 6/2005 | Lentz et al. | |
| 2010/0051707 A1 * | 3/2010 | Conzelmann | G01K 3/04 235/494 |
| 2011/0048313 A1 * | 3/2011 | Bako | H01J 7/42 116/216 |
| 2014/0002530 A1 * | 1/2014 | Thompson | B41M 7/0081 347/16 |

FOREIGN PATENT DOCUMENTS

| | | | | |
|---|---|---|---|---|
| JP | 01304653 A | * | 12/1989 | H01J 61/35 |
| JP | 03062445 A | * | 3/1991 | H01J 61/35 |
| WO | WO 2012018766 A2 | * | 2/2012 | B01D 46/0086 |

* cited by examiner

UV LAMP SERVICE LIFE INDICATOR DEVICE AND METHOD OF USING THE SAME

FIELD

This disclosure relates generally to ultraviolet (UV) air treatment systems, and more particularly, this disclosure relates to systems and methods for indicating service life of UV lamps.

BACKGROUND

It has long been known to use heating, ventilation and air conditioning (HVAC) systems for enclosed structures. HVAC systems usually comprise one or more blowers connected to a circuit of ventilation ducts to control the amount and direction of airflow throughout the structure. While some fresh air may be introduced into the system, much of the air within the enclosed structure can be recycled through the system. HVAC systems are also typically employed, as the name suggests, to control the air temperature of the enclosed environment by controlling the temperature of the air directed therein.

Dark and damp conditions within the ducts of an HVAC system are conducive to the rapid growth and reproduction of contaminants such as molds, spores, bacteria, viruses and mildews which may be harmful to the people for whom the air traveling therethrough is intended. HVAC systems thus become a breeding ground for these contaminants. Inhabitants may suffer adverse physical reactions as a result, especially if they are allergic to any of the contaminants. This problem is exacerbated when the inhabitants themselves introduce additional contaminants into the HVAC system that may then multiply in the contaminant friendly HVAC environment and spread to other inhabitants located within the structure. Air filters have been introduced into HVAC systems in an attempt to remove contaminants passing therethrough before they reach inhabitants. However, these filters often become damp themselves and provide conditions which foster growth and reproduction of the contaminants.

It is known that certain UV light can control growth of or kill most contaminants currently known to exist within HVAC systems. Low-intensity UV radiation can be used to kill organisms growing on surfaces in HVAC systems, and high-intensity UV radiation can be used to kill airborne organism as they pass near a UV lamp. However, the effectiveness of UV lamps diminishes over time. As a result, the UV lamps must be replaced periodically to maintain the level of effectiveness they were designed for.

SUMMARY

Some embodiments of a UV lamp service life indicator device can be configured to indicate a status of a useful life of a UV lamp, for example, whether the UV lamp is approaching or has come to an end of its service life. The UV lamp service life indicator device may be a multi-valued indicator or a binary indicator (e.g., indicating "yes" or "no"). For example, the UV lamp service life indicator may comprise a material that degrades at a rate sufficient to track a useful life of a UV lamp.

In one embodiment, a UV lamp service life indicator device includes an indicator member including a material that degrades at a rate sufficient to track a useful life of a UV lamp. The indicator member indicates a status of a useful life of a UV lamp, for example, whether the UV lamp is approaching or has come to an end of its service life.

In another embodiment, a UV air treatment system includes a UV lamp; an indicator device including a material that degrades at a rate sufficient to track a useful life of a UV lamp; and a reference component that indicates a status of a useful life of a UV lamp, for example, whether the UV lamp is approaching or has come to an end of its service life.

In a further embodiment, a method of servicing a UV lamp comprises subjecting a degradable material of a UV lamp service life indicator device to UV radiation; allowing changing of a characteristic of the degradable material; detecting a detectable condition of the indicator device indicating a status of a useful life of a UV lamp, for example, whether the UV lamp is approaching or has come to an end of its service life; and changing the UV lamp with a new UV lamp.

In a still further embodiment, a method of detecting a detectable condition of a UV lamp including subjecting a degradable material of a UV lamp service life indicator device to UV radiation; allowing changing of a characteristic of the degradable material; and detecting a detectable condition of the indicator device.

The details of one or more embodiments are set forth in the accompanying drawings and the description below. Other features, objects and advantages of the embodiments will be apparent from the description and drawings, and from the claims.

DESCRIPTION OF THE DRAWINGS

Like reference symbols in the various drawings indicate like elements.

DETAILED DESCRIPTION

References are made to the accompanying drawings that form a part hereof, and in which is shown by way of illustration of the embodiments in which the methods and systems described herein may be practiced. The term "air handler" refers to HVAC units of all kinds such as, but not limited to, air conditioners, heaters, humidifiers, and dehumidifiers, air-cleaning or air-purifying devices, as may be for example installed as a single unit, as multiple units and in combination, as well as any air treatment or air delivery device and associated ducts. The term "UV lamp" refers to any UV light sources, including a UV light bulb. The term "UV service life indicator" refers to a device that is capable of providing information pertaining to when a UV lamp may no longer be suitable for use due to partial or full exhaustion of the lamp capacity. The term "UV degradable" refers to a mechanical, electrical, chemical or other property of a material that can change as a result of UV exposure. The term "window" refers to a structure that provides the ability for a person to see through. The term "service position" means a position of a UV lamp service life indicator that indicates the service life of the UV lamp. The term "detectable condition" refers to the indication, which may be detected, that tells when it is approaching the time or has come to the time to replace the UV lamp has arrived.

Some embodiments of a UV lamp service life indicator device can be configured to indicate a status of a useful life of a UV lamp, for example, whether the UV lamp is approaching or has come to an end of its service life. The UV lamp service life indicator device may be a multi-valued indicator or a binary indicator (e.g., indicating "yes" or "no"). For example, the UV lamp service life indicator may comprise a material that degrades at a rate sufficient to track a useful life of a UV lamp.

Figure 1:
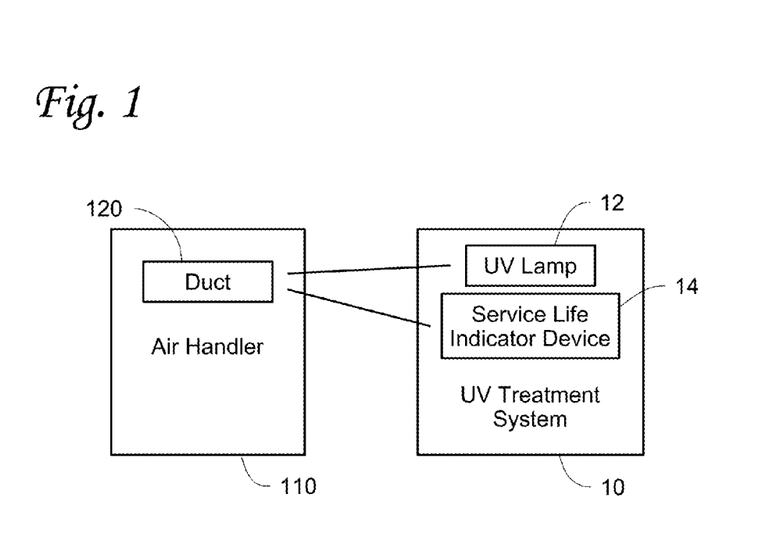
FIG. 1 is a block diagram of one embodiment of a UV air treatment system in conjunction with an air handler.
Figure 2:
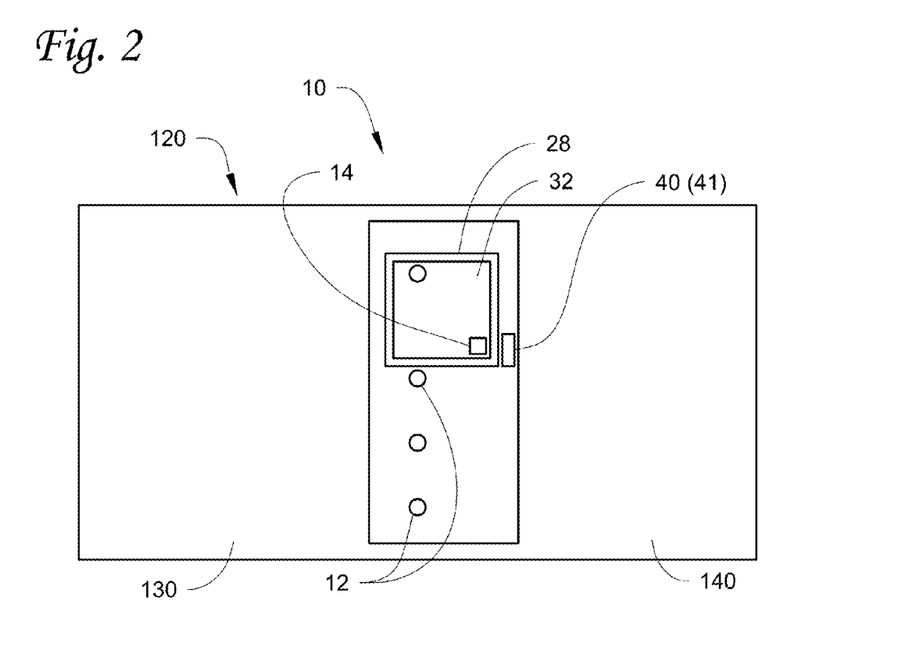
FIG. 2 is a schematic view of one embodiment of a UV air treatment system including a UV lamp and a service life indicator device.

With reference to FIG. 1, a UV air treatment system 10 is shown in block form in conjunction with an air handler 110. It is to be understood that the air handler 110 can assume a wide variety of forms appropriate for a particular residential, commercial or industrial application. Thus, the air handler 110 can include a wide variety of air handling components, such as heating systems (e.g., furnace, heat pump, electric heat, etc.), cooling systems (e.g., air conditioner, swamp cooler, etc.), humidifiers, filters, etc. Further, the air handler 110 can be constructed to direct heated, cooled and/or filtered air to a number of separate rooms, or can be installed in a single room. The air handler 110 can operate in either an "off state" or an "on state", and includes a return air duct 120 through which air is cycled. In the off state, the air handler 110 does not actively draw and/or force air through the duct 120. For example, where the air handler 110 includes a blower/fan, when the fan/blower is off, the air handler 110 is in the off state. Conversely, in the on state, the air handler 110 is activated to force or draw air through the duct 120. For example, the on state is in reference to the fan/blower in an operation mode. Referring to FIG. 2, the duct 120 includes a wall 130. The inner surface of the wall 130 defines an air passage 140.

Figure 5:
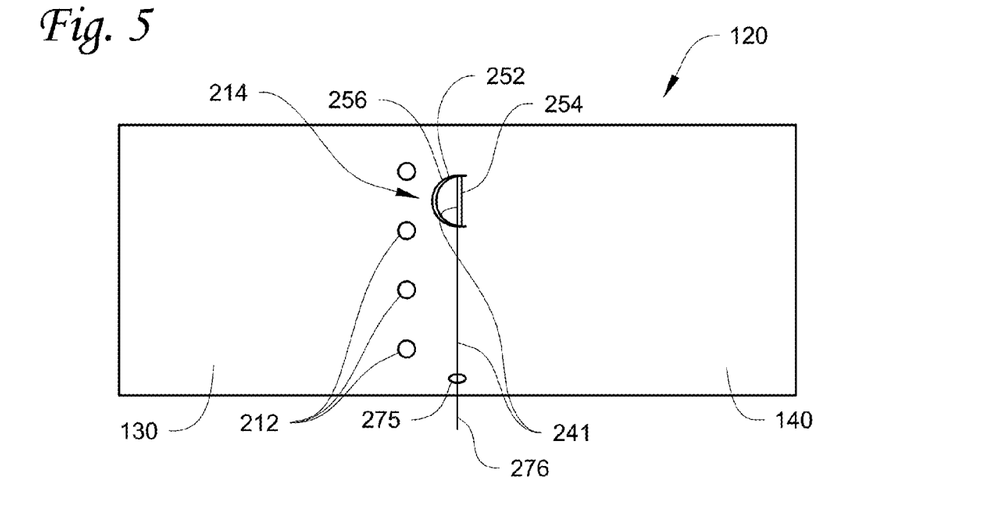
FIG. 5 is a schematic view of another embodiment of a UV air treatment system including a UV lamp and a service life indicator device.

Referring to FIGS. 1-2 and 5, the UV air treatment system 10 can be configured to include a UV lamp 12 mounted to the duct 120 in the air passage 140 and include a service life indicator device 14. The UV lamp 12 can likewise assume a variety of forms as applicable. It is to be understood that the UV lamp 12 and the service life indicator device 14 can be located in other ducts rather than the duct 120, such as a supply duct and/or return duct, as desired and/or suitable.

Figure 3A:
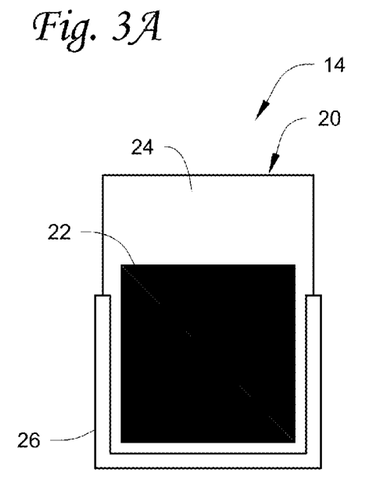
FIGS. 3A-B are schematic views of the service life indicator device of FIG. 2.
Figure 3B:
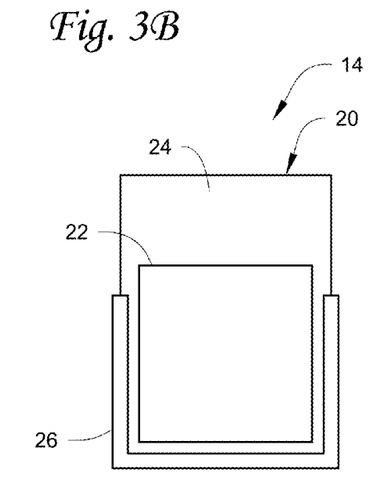
Figure 6A:
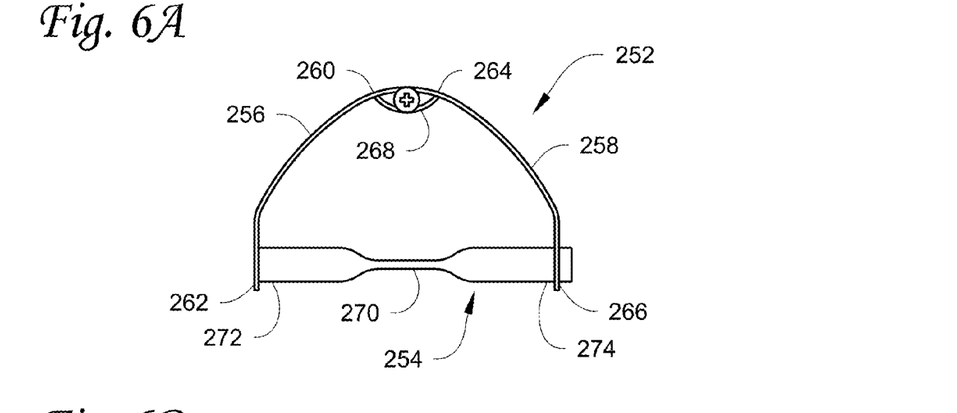
FIGS. 6A-B are schematic views of the service life indicator device of FIG. 5.
Figure 6B:
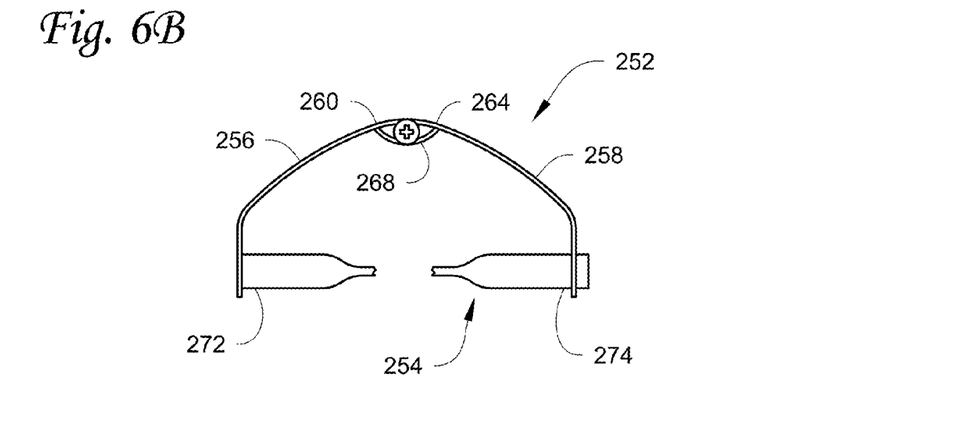

Still referring to FIGS. 1-2 and 5, the service life indicator device 14 can be configured to provide an indication of a status of a useful life of a UV lamp, for example, whether the UV lamp is approaching or has come to an end of its service life. For example, the UV lamp service life indicator device may be a multi-valued indicator (as shown in FIGS. 3A-B) or a binary indicator (e.g., indicating "yes" or "no") (as shown in FIGS. 6A-B). The indicator device 14 can be made of a material which is degradable by UV radiation exposure. Specifically, the indicator device 14 is configured to include a material with a physical property that may change, for example, discoloration, loss of mechanical strength, change of electrical resistance, change of chemical property, etc. The indication provided by the indicator device 14 allows the UV lamp to be replaced in time, thereby avoiding the problem of using UV lamps beyond its effective life. The indicator device 14 is generally secured within the duct 120 and placed in a location such that the indicator device 14 is subjected to UV radiation. In some embodiments, the indicator device 14 is desirably positioned to receive suitable UV exposure. In some embodiments, the indicator device 14 can be replaced with a new indicator device after use.

Referring now to FIGS. 2, 3A-B and 4, the indicator device 14 can be a multi-valued indicator. The indicator device 14 is configured to include at least one pigment layer 22 capable of degrading when exposed to UV radiation. The pigment layer 22 is placed in a path of UV radiation. The pigment layer 22 is used to measure for example the period of UV radiation on the pigment layer 22 to provide an indication of the life of the UV lamp 12. The properties of the pigment layer 22 and the material thickness of the pigment layer 22 are selected such that the color degradation of the pigment layer 22 occurs at a rate sufficient to track the useful life of the UV lamp 12. Factors to consider in designing the indicator device 14 to correspond to the life of the UV lamp 12 include, but are not limited to, the choice of pigment, the concentration of the pigment, the amount of the pigment, and the location of the indicator device relative to the UV lamp 12. It is to be understood that the indicator device 14 can include multiple layers or sections, wherein layer(s) and/or section can include a different pigment or be the same pigment. It is to be understood that any pigment material that degrades at a rate sufficient to track the useful life of the UV lamp when exposed to UV radiation is within the scope of this disclosure. The pigment can be for example, painted, printed or otherwise applied directly on the wall 130 of the duct, or alternatively, on a carrier member 20 of the indicator device 14, or on a UV lamp support structure.

The carrier member 20 can be formed in any shape or size that is suitable to be attached to duct 120 in the air passage 130, such as square, rectangular, circular, etc. The carrier member 20 includes two opposing major surfaces 24, with the pigment layer 22 covering one of the major surfaces 24. The carrier member 20 can be made of any transparent material (e.g., glass, plastic, etc.), translucent material, or opaque material, as long as it can be used to carry the pigment layer 22 during the service life of a UV lamp. For example, suitable materials include glass, plastics, and the like. Moreover, the carrier member 20 can be made of a material having a useful life greater than or equal to the useful life of the UV lamp 12 to be measured when exposed to UV radiation. In some embodiments, the carrier member 20 is non-degradable upon exposure to UV radiation and is not used to track useful life of the UV lamp 12. For the purpose of the following discussion, the carrier member 20 is described as a piece of rectangular glass and the pigment layer 22 is a pigment square painted on the glass carrier member 20.

The carrier member 20 can be mounted directly to the wall 130 of the duct 120 or on the UV lamp holder/support structure by a fastening mechanism, such as adhesive, hook and loop fasteners, screws, snaps, or the like. Alternatively, as shown in FIGS. 2 and 3, the indicator device 14 includes a holder 26 that allows the carrier member 20 to be slid therein. It is to be understood that other types of holding mechanisms can be used to hold the carrier member 20 therein. The holder 26 can be made of various materials, e.g., metal, plastic, glass, etc., as long as the material has a useful life greater than or equal to the useful life of the UV lamp 12 to be measured when exposed to UV radiation. In some embodiments, the holder 26 is non-degradable upon exposure to UV radiation and is not used to track useful life of the UV lamp 12. The holder 26 can be affixed to the wall 130 of the duct 120 by various fastening mechanisms, e.g., such as adhesive, hook and loop fasteners, screws, snaps, or the like.

When the carrier member 20 is made of transparent material, the pigment layer 22 can be positioned either facing toward the UV lamp 12 or facing away from the UV lamp 12. When the carrier member 20 is made of opaque material, the pigment layer 22 is positioned facing toward the UV lamp 12 to allow exposure to UV radiation.

As shown in FIGS. 2, 3A-B and 4, in some embodiments, the UV treatment system 10 includes a view window 28 for example defined in the wall 130 of the duct 120 to allow the indicator device 14 to be easily viewed external to the duct 120. The view window 28 has an inner surface positioned to face toward the air passage 140 and an outer surface 32 positioned to face toward the viewer. The view window 28 is made of a material which is sufficiently optically transparent of light to enable viewing at least a portion of the carrier member 20 through the view window 28. The material that can be used to make the view window 28 can be a material suitable to allow viewing therethrough, such as for example, glass, plastic, etc.

In some embodiments, the indicator device 14 is placed within the range of the view angle direction of the view window 28. Alternatively, the indicator device 14 can be disposed directly on the inner surface of the view window 28 to allow close observation of the status of the indicator device 14. If no view window is employed, the viewer can open the duct to observe the status of the indicator device 14.

Figure 4:
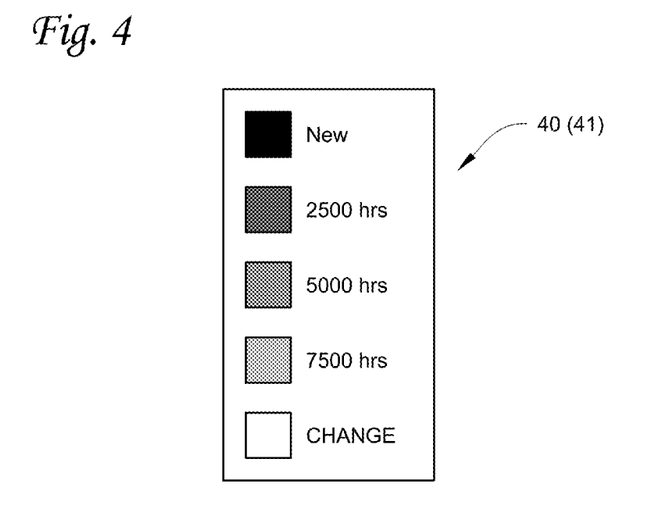
FIG. 4 is a close-up view of a reference component of FIG. 2.

Optionally, the UV air treatment system 10 can include a reference component 40 to provide a detectable condition to indicate the remaining life of the UV lamp 12. In the embodiment depicted in FIGS. 2, 3A-B and 4, the reference component 40 is a reference label 41 including colored squares that match the pigment layer 22 in various stages of degradation, e.g., fading. It is to be understood that other shapes, rather than squares, can be used on the reference label 41 to show the different stages of degrading of the pigment layer 22. Referring to FIG. 4, the reference label 41 can include labeling to indicate the status of the UV lamp 12. For example, as shown in FIG. 4, "NEW," "2500 HRS," "5000 HRS," "7500 HRS," "CHANGE (the UV lamp needs to be changed)" can be used to indicate the length of time that the UV lamp 12 has been used. In other embodiments, the reference label 41 can include labeling to indicate the remaining useful life of the UV lamp 12, for example "WARNING," "CAUTION," "CHANGE," and the like.

In some embodiments, the reference label 41 can be disposed onto an outer surface of the duct 120 adjacent the view window 28. The user can look through the view window 28 and compare the color of the pigment layer 22 on the carrier member 20 to the colors on the reference label 41. In alternative embodiments, no view window 28 is designed for the UV air treatment system 10, the reference label 41 can be positioned at the duct 120 adjacent the indicator device 14. It is to be understood that other reference methods can be employed depending on the desired application.

Referring now to FIGS. 5 and 6A-B, in some embodiments, the service life indicator device can be a binary indicator to indicate a status of a useful life of a UV lamp, for example, whether the UV lamp is approaching or has come to an end of its service life. For example, a service life indicator 214 can include a tension mechanism 252 and an elongate member 254 holding the tension mechanism 252. The tension mechanism 252 can be positioned in a tensioned position (referring to FIG. 6A when the tension member 252 is held by the elongate member 254 and a service position (referring to FIG. 6B) when the tension member 252 is not held by the elongate member 254 (e.g., the elongate member 254 is broken) and is in a released position.

In the depicted embodiment as shown in FIGS. 5 and 6A-B, the tension mechanism 252 can include first and second lever arms 256, 258 connected to each other from ends 260, 264 of the first and second lever arms 256, 258 and the elongate member 254 is holding the free ends 262, 266 of the first and second lever arms 256, 258. An elastic member 268 can be disposed between the ends 260, 264 of the first and second lever arms 256, 258 for biasing the lever arms 256, 258 to return from the tensioned position as shown in FIG. 6A to the service position as shown in FIG. 6B. In some embodiments, the elastic member 268 is a spring.

The tension mechanism 252 can be made of a material having a useful life greater than the useful life of the UV lamp 212 to be measured when exposed to UV radiation. The tension mechanism 252 can be made of metal, UV resistant plastic, or the like. The tension mechanism 252 can be mounted directly to the wall 130 of the duct 120 or a UV lamp support structure by a fastening mechanism, such as adhesive, hook and loop fasteners, screws, snaps, or the like.

The elongate member 254 can be made of an expendable material such as a polymer. The elongate member 254 can be positioned in various positions relative to the UV lamp 212 as long as it is exposed to UV radiation. In some embodiments, the elongate member 254 may be constructed to have a shape having a indicator thickness in a middle portion 270 of the elongate member 254 and a supporting thickness at two ends 272, 274, and may be shaped like a tensile test bar. Alternatively, the elongate member 254 may be constructed to have a shape having a uniform thickness. The middle portion 270 with the smaller thickness allows the elongate member 254 to eventually break under the tension of the tension mechanism 252. In some embodiments, the supporting thickness can be greater than the indicator thickness. In alternative embodiments, the supporting thickness can be about the same or even less than the indicator thickness.

This elongate member 254 is used to indicate a status of a useful life of the UV lamp 212, for example, whether the UV lamp 212 is approaching or has come to an end of its service life. The properties of the elongate member 254 are selected such that the strength degradation of the elongate member 254 occurs at a rate sufficient to track the useful life of the UV lamp 212. Factors to consider in designing the elongate member 254 to correspond to the end of the life of the UV lamp 212 include, but are not limited to, the choice of material, the shape and size of the elongate member 254, and the location of the indicator device 214 relative to the UV lamp 212. It is to be understood that the elongate member of the indicator device 214 can include a plurality of strands such as polymer stands. It is to be understood that other materials can be used to make the elongate member. In some embodiments, the elongate member 254 is made of a material that does not stretch under tension, develops a weakness upon exposure to UV light, and continues to weaken under UV exposure. For example, the elongate member 254 can be made of a material that does not form a protective layer after exposure to UV lights. In such a case, the number of strands is also a factor to be considered in designing the elongate member 254. It is to be understood that any material of which the strength degrades at a rate sufficient to track the useful life of the UV lamp when exposed to UV radiation is within the scope of this disclosure.

When a view window is employed, the indicator device 214 is placed within the range of the view angle to allow the viewer to observe the status. Alternatively, in some embodiments, the indicator device 214 can be attached to the inner surface of the view window to allow close observation of the status of the indicator device 214.

Referring to FIG. 5, if no view window is employed, the UV air treatment system can include a reference component 240 to provide a visual indication of a status of a useful life of a UV lamp 212, for example, whether the UV lamp 212 is approaching or has come to an end of its service life. In the embodiment depicted in FIGS. 5 and 6A-B, the reference component 240 can be a reference line 241 such as for example a wire or cable attached to the first lever arm 256 and inserted through a small opening 275 in the UV air treatment system. The free end 266 of the second arm 258 is fixed relative to the duct 120. When the elongate member 254 breaks, the free end 262 of the first lever arm 256 moves upwardly under an elastic force of the elastic member 268 and pulls on the reference line 241. An end 276 of the reference line 241 can be colored to show a detectable condition indicating whether the tension mechanism 252 has opened up and is in a service position. For example, a length protruding from the unit would serve to indicate the status of the indicator device 214. As one example only, 1 inch protruding can indicate "OK"; ¼ inch protruding can indicate "CHANGE (the UV lamp needs to be changed)." In other embodiments, the reference line 241 and the tension mechanism 252 are arranged such that the end 276 of the reference line 241 moves to a lower position when the UV lamp needs to be changed.

Figure 7:
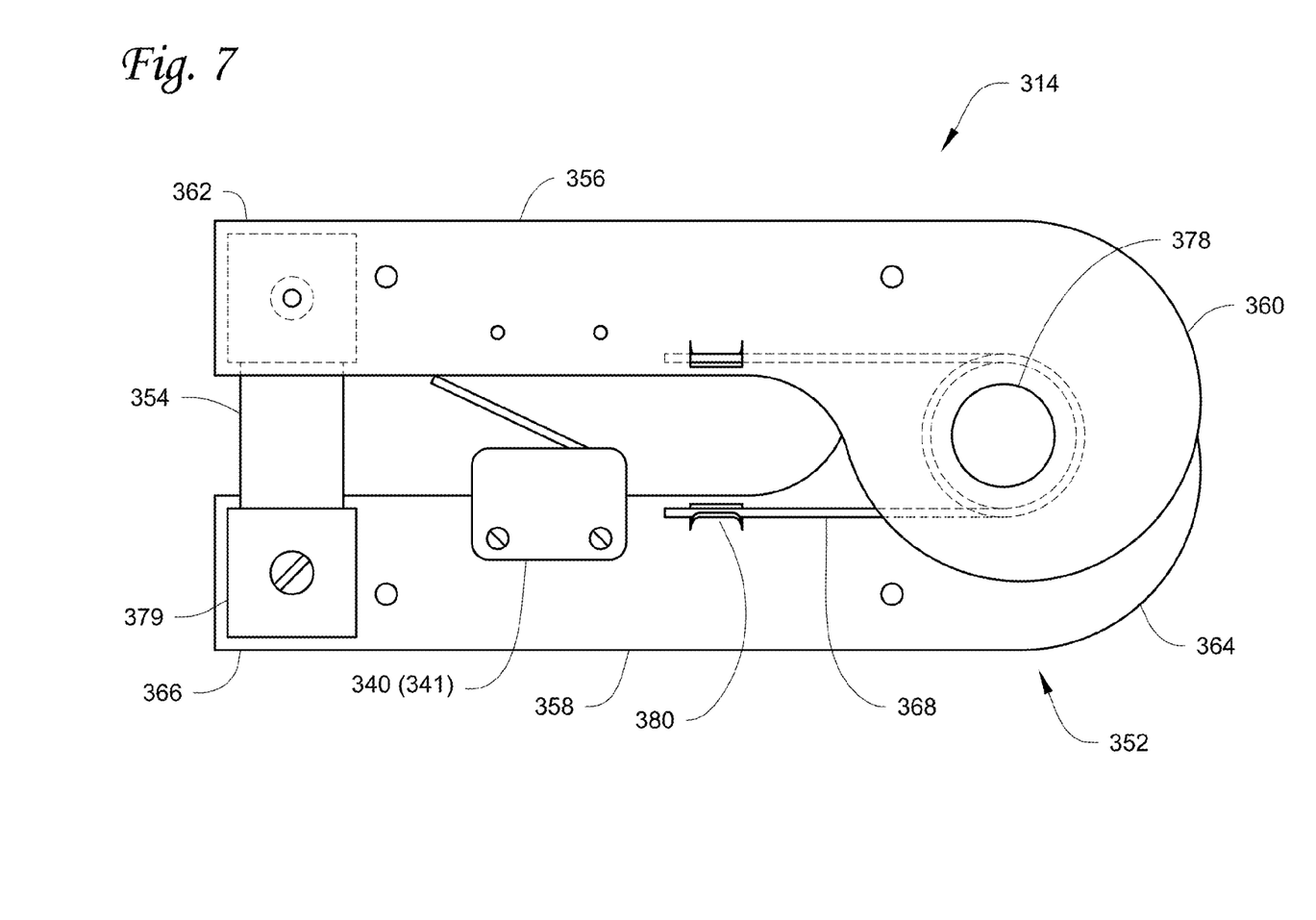
FIG. 7 is a schematic view of a further embodiment of a service life indicator device.
Figure 8:
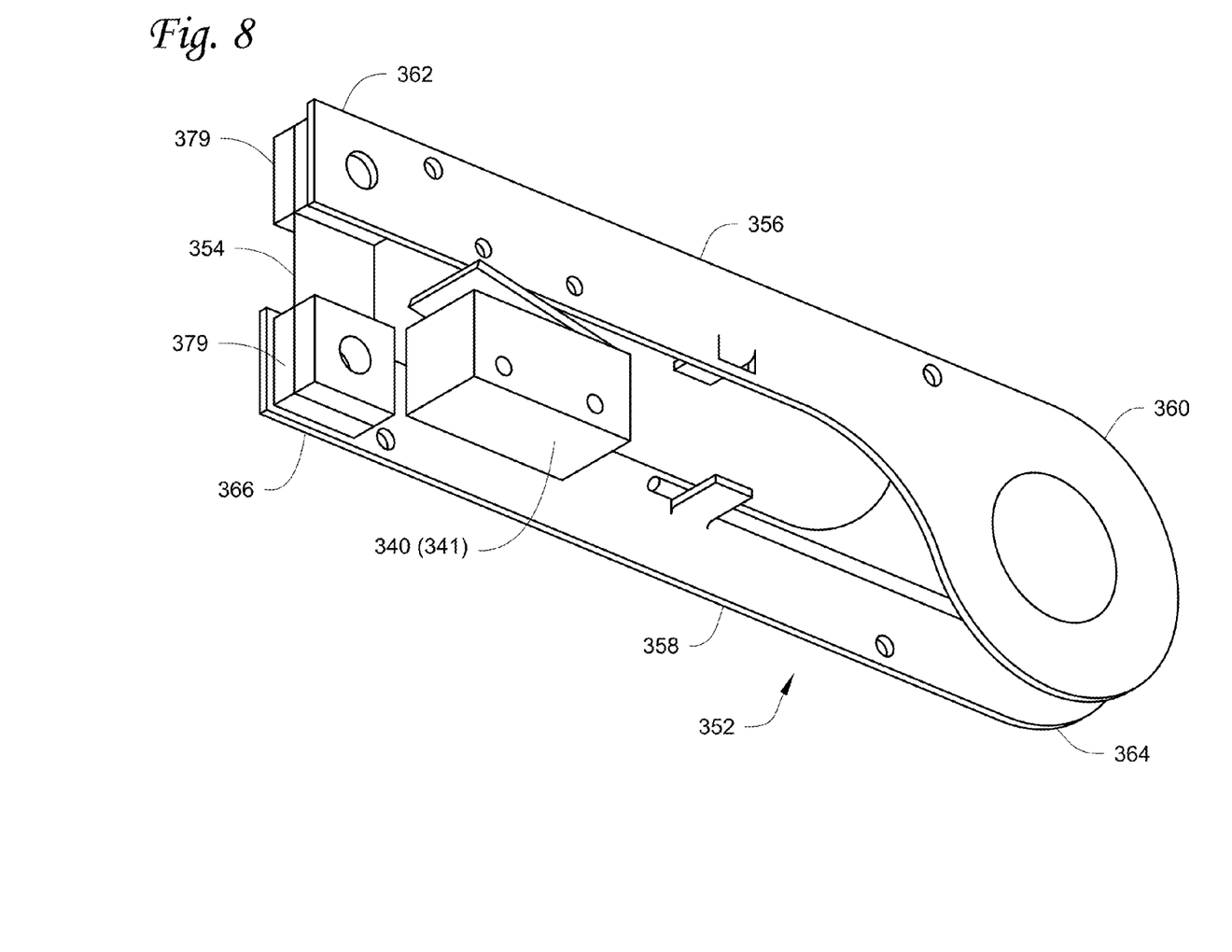
FIG. 8 is a perspective view of the service life indicator device of FIG. 7.

Referring now to FIGS. 7-8, other embodiments of a binary service life indicator device are illustrated. As shown in FIGS. 7-8, a service life indicator 314 can include a tension mechanism 352 and an elongate member 354 holding the tension mechanism 352. The tension mechanism 352 can include first and second lever arms 356, 358 connected to each other from ends 360, 364 of the first and second lever arms 356, 358 by a fastening mechanism 378 such as a rivet. The elongate member 354 is configured to hold the free ends 362, 366 of the first and second lever arms 356, 358 by respective holders 379. An elastic member 368 such as a torsion spring can be disposed between the first and second lever arms 356, 358 for biasing the lever arms 356, 358 to return from a tensioned position (as shown in FIG. 7) to a service position. In some embodiments, the elastic member 368 such as a torsion spring can be attached to holders 380.

The tension mechanism 352 can be made of a material having a useful life greater than the useful life of the UV lamp to be measured when exposed to UV radiation. The tension mechanism 352 can be made of metal, UV resistant plastic, or the like. The elongate member 354 can be made of an expendable material such as a polymer. The elongate member 354 can be positioned in various positions relative to the UV lamp as long as it is exposed to UV radiation. In some embodiments, the elongate member 354 may be constructed to be a strip of material secured between the ends 362, 366, and the strip of material can have a relatively uniform width.

The reference component 340 can be a micro switch 341 attached to the second lever arm 356. When the elongate member 354 breaks, the free ends 362, 366 move apart from each other under an elastic force of the elastic member 368 and the micro switch 341 can be triggered, e.g., turned on, to communicate a detectable condition indicating that the tension mechanism 352 has opened up and is in a service position. For example, when the switch 341 is triggered, the detectable condition that can be communicated, in some embodiments, may be an alarm that is turned on, to alert the operator that the UV lamp needs to be changed. It would be appreciated that one would understand that the alarm can be a visual or sound source for alerting the user a status of a useful life of a UV lamp, for example, whether the UV lamp is approaching or has come to an end of its service life.

Figure 9:
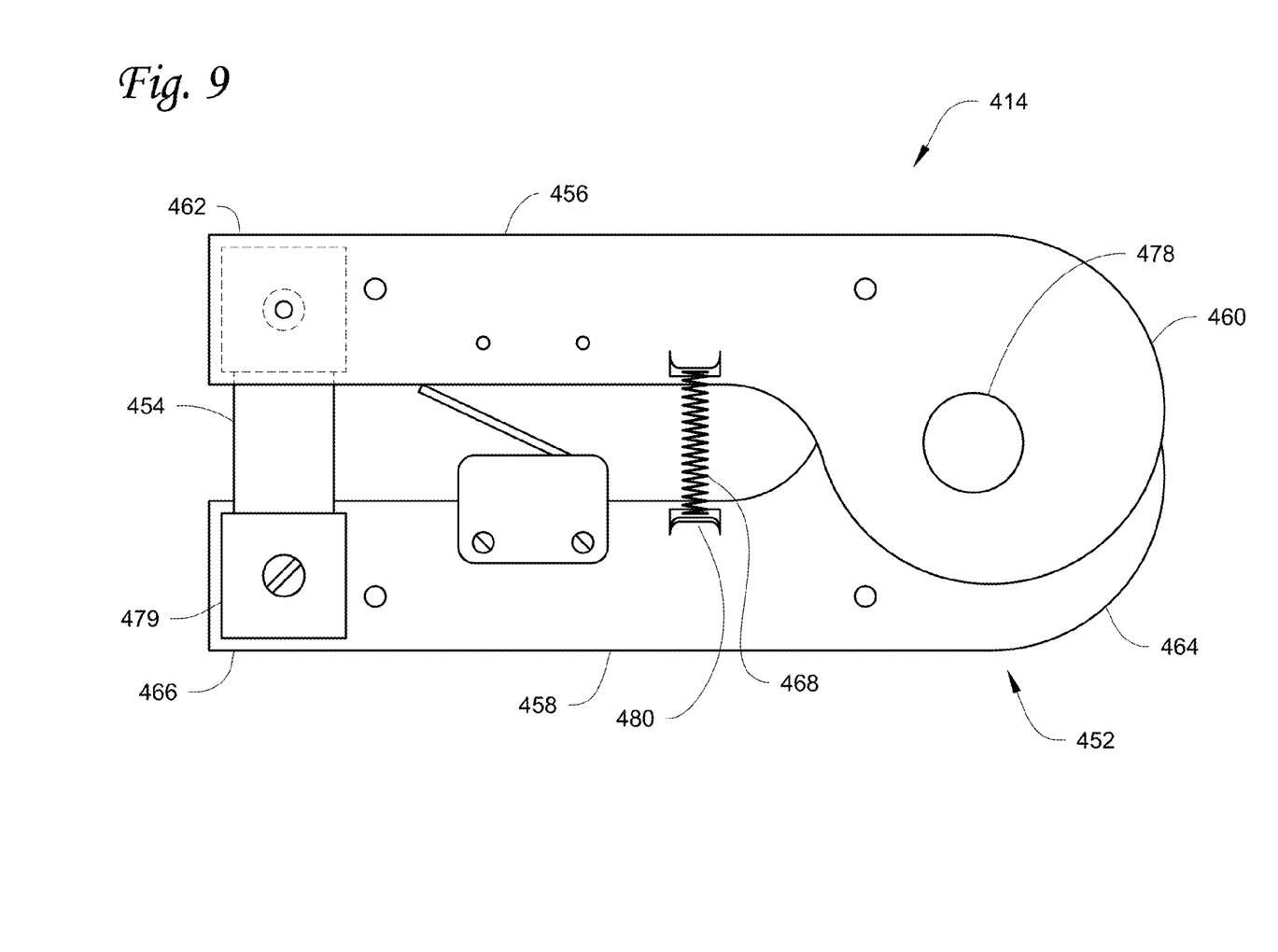
FIG. 9 is a schematic view of a still further embodiment of a service life indicator device.

Referring now to FIG. 9, in this embodiment, a service life indicator 414 can include a tension mechanism 452 and an elongate member 454 holding the tension mechanism 452. The tension mechanism 452 can include first and second lever arms 456, 458 connected to each other from ends 460, 464 of the first and second lever arms 456, 458 by a fastening mechanism 478 such as a rivet. The elongate member 454 is configured to hold the free ends 462, 466 of the first and second lever arms 456, 458 by respective holders 479. An elastic member 468 takes a form of a compression spring disposed between the first and second lever arms 456, 458 for biasing the lever arms 456, 458 to return from a tensioned position (as shown in FIG. 7) to a service position. In some embodiments, the elastic member 468 such as the compression spring is held in a holder 480.

In summary, in some embodiments, the service life indicator device can be a direct indicator device of which the degradable material is viewable directly to the user to show the status of the useful life of the UV lamp, such as the service life indicator shown in FIGS. 2, 3A-B and 4. In some embodiments, the service life indicator device can be an indirect indicator device of which the degradable material is not viewable directly to the user, such as the service life indicators shown in FIGS. 5, 6A-B and 7-10.

Figure 10:
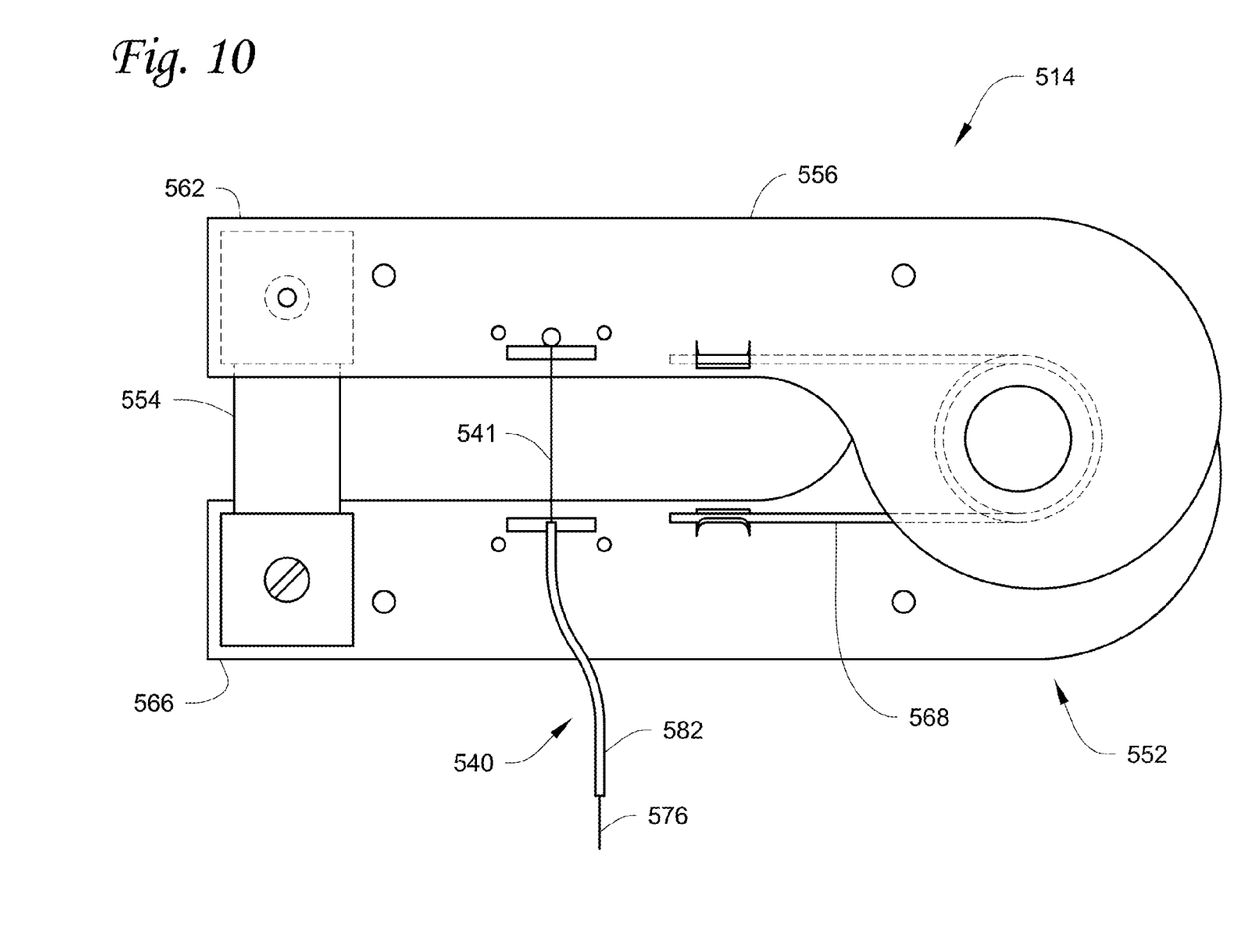
FIG. 10 is a schematic view of a yet further embodiment of a service life indicator device.

Referring now to FIG. 10, a further embodiment of a binary service life indicator device is illustrated. As shown in FIG. 10, a service life indicator 514 can include a reference component 540 that takes a form of a reference line 541 attached to the first lever arm 556 and threaded through a sheath 582 in the UV air treatment system. When an elongate member 554 breaks, free ends 562, 566 move apart from each other under an elastic force of the elastic member 568 such as a torsion spring and pulls on the reference line 541 relative to the sheath 582. An end 576 of the reference line 541 can be colored to show a detectable condition indicating whether the tension mechanism 552 has opened up and is in a service position. For example, a length protruding from the sheath 582 would serve to indicate the status of the indicator device 514. As one example only, 1 inch protruding can indicate "OK"; ¼ inch protruding can indicate "CHANGE (the UV lamp needs to be changed)."

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A UV lamp service life indicator device, comprising:
an indicator member including a UV degradable material that degrades at a rate sufficient to track a useful life of a UV lamp, wherein the indicator member indicates a status of the useful life of the UV lamp, and wherein the indicator member includes an elongate member of which the strength degrades at a rate sufficient to track a useful life of a UV lamp.

2. The UV lamp service life indicator device of claim 1, wherein the service life indicator device is a direct indicator device of which the degradable material is viewable directly to a user, or an indirect indicator device of which the degradable material is not viewable directly to a user.

3. The UV lamp service life indicator device of claim 1, wherein the indicator member is a multi-valued indicator.

4. The UV lamp service life indicator device of claim 1, wherein the indicator member is a binary indicator.

5. The UV lamp service life indicator device of claim 1, wherein the indicator member includes one or more pigment layers that degrade at a rate sufficient to track a useful life of a UV lamp.

6. The UV lamp service life indicator device of claim 5, wherein the indicator member further includes a carrier member that receives the pigment layer.

7. The UV lamp service life indicator device of claim 1, further comprising a tension mechanism positioned between a tensioned position when the tension mechanism is held by the elongate member and a service position when the elongate member is broken and the tensioned position is released.

8. The UV lamp service life indicator device of claim 1, wherein the indicator member is replaceable.

9. The UV lamp service life indicator device of claim 1, further comprising:
  a UV lamp; and
  a reference component that indicates the status of the useful life of the UV lamp based on a change to the indicator member.

10. The UV lamp service life indicator device of claim 9, wherein the reference component includes labeling that indicates two or more statuses of the useful life of the UV lamp for comparison with the status of the indicator member.

11. The UV lamp service life indicator device of claim 9, wherein the reference component includes: 1) a reference line, in which a position of the reference line is changeable based on degradation of the UV degradable material, 2) a switch activated by degradation of the UV degradable material, or 3) a torsion spring.

12. A UV lamp service life indicator device, comprising:
  a UV lamp;
  an indicator member including a UV degradable material that degrades at a rate sufficient to track a useful life of the UV lamp; and
  a reference component that indicates the status of the useful life of the UV lamp based on a change to the indicator member, wherein the indicator member indicates a status of the useful life of the UV lamp, and wherein the reference component includes: 1) a reference line, in which a position of the reference line is changeable based on degradation of the UV degradable material, 2) a switch activated by degradation of the UV degradable material, or 3) a torsion spring.

13. A method of servicing a UV lamp, comprising:
  subjecting a degradable material of a UV lamp service life indicator device to UV radiation;
  changing a characteristic of the degradable material;
  releasing a tension and activating a switch;
  detecting a detectable condition of the indicator device indicating a status of a useful life of the UV lamp; and
  changing the UV lamp with a new UV lamp.

14. A method of servicing a UV lamp, comprising:
  subjecting a degradable material of a UV lamp service life indicator device to UV radiation;
  changing a characteristic of the degradable material;
  releasing a tension and changing a position of a reference line;
  detecting a detectable condition of the indicator device indicating a status of a useful life of the UV lamp; and
  changing the UV lamp with a new UV lamp.

15. A method of detecting a detectable condition of a UV lamp, comprising:
  subjecting a degradable material of a UV lamp service life indicator device to UV radiation;
  changing a characteristic of the degradable material;
  releasing a tension and activating a switch; and
  detecting a detectable condition of the indicator device based on the changed characteristic of the degradable material.

16. A method of detecting a detectable condition of a UV lamp, comprising:
  subjecting a degradable material of a UV lamp service life indicator device to UV radiation;
  changing a characteristic of the degradable material;
  releasing a tension and changing a position of a reference line; and
  detecting a detectable condition of the indicator device based on the changed characteristic of the degradable material.

* * * * *